US011630750B1

(12) United States Patent
Chang et al.

(10) Patent No.: US 11,630,750 B1
(45) Date of Patent: Apr. 18, 2023

(54) SYSTEMS AND METHODS FOR CONFIGURING A CENTRAL PROCESSING UNIT HAVING MULTIPLE CORES

(71) Applicant: Marvell Asia Pte, Ltd., Singapore (SG)

(72) Inventors: Runzi Chang, Saratoga, CA (US);
Jianhua Bi, San Jose, CA (US)

(73) Assignee: Marvell Asia Pte, Ltd., Singapore (SG)

(*) Notice: Subject to any disclaimer, the term of this patent is extended or adjusted under 35 U.S.C. 154(b) by 258 days.

(21) Appl. No.: 17/071,910

(22) Filed: Oct. 15, 2020

Related U.S. Application Data

(60) Provisional application No. 62/916,105, filed on Oct. 16, 2019.

(51) Int. Cl.
| | |
|---|---|
| *G06F 11/34* | (2006.01) |
| *G06F 9/48* | (2006.01) |
| *G06F 11/22* | (2006.01) |
| *G06F 11/07* | (2006.01) |

(52) U.S. Cl.
CPC .......... *G06F 11/3428* (2013.01); *G06F 9/485* (2013.01); *G06F 11/0724* (2013.01); *G06F 11/2242* (2013.01)

(58) Field of Classification Search
CPC ............ G06F 11/0724; G06F 11/2242; G06F 11/3428; G06F 9/485
USPC ....................................................... 702/186
See application file for complete search history.

(56) References Cited

U.S. PATENT DOCUMENTS 9,983,966 B2 * 5/2018 Parikh ................... G06F 11/263

* cited by examiner

*Primary Examiner* — John H Le (57) ABSTRACT

A CPU having a plurality of cores is configured by determining a number of cores required for operation of the CPU. Each respective core is tested, and a performance parameter of the respective core is determined based on the test. The respective core is then classified for suitability to perform a set of functions based on the performance parameter of the respective core. If at least the number of cores required for operation of the CPU are classified for suitability to perform the set of functions, a subset of suitable cores is defined, the subset including cores that are classified for the set of functions and at least the number of cores required for operation of the CPU. The required number of cores from among the subset of cores are then enabled.

22 Claims, 8 Drawing Sheets

SYSTEMS AND METHODS FOR CONFIGURING A CENTRAL PROCESSING UNIT HAVING MULTIPLE CORES

CROSS-REFERENCE TO RELATED APPLICATIONS

This disclosure claims the benefit under 35 U.S.C. § 119(e) of U.S. Provisional Patent Application No. 62/916,105, filed Oct. 16, 2019, which is hereby incorporated by reference herein in its entirety.

FIELD OF USE

This disclosure relates to multi-core central processing units, and specifically, to multi-core central processing units (CPUs) that are enabled for selectable configuration and use based on an identified absence or presence of one or more manufacturing process defects in a given CPU.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Typical manufacturing processes use many masking steps to deposit individual layers of material onto silicon wafers to form a complete chip. These processes are prone to defects in masking which results in material being deposited in areas where no material should be deposited in any given manufacturing step. Depending on the location of these defects, a portion of a chip, or the chip in its entirety, may be nonfunctional and must be discarded. Each manufacturing process has an average number of defects per unit of area. The larger a chip is, the more defects in may contain. The larger a CPU is, the more likely it is that a defect will occur within the area occupied by the CPU.

SUMMARY

Implementations described herein provide an apparatus and method for configuring a CPU having a plurality of cores by determining a number of cores among the plurality of cores required for operation of the CPU. The CPU includes selection circuitry for testing and monitoring performance of each core of the CPU. For each respective core among the plurality of cores, a test of the respective core is performed, and a performance parameter of the respective core is determined based on the test. The respective core is then classified for suitability to perform a set of functions based on the performance parameter of the respective core. Once all cores have been tested, it is determined whether at least the number of cores required for operation of the CPU, among the plurality of cores, are classified for suitability to perform the set of functions. If so, a subset of suitable cores is defined, the subset including cores that are classified for the set of functions and at least the number of cores required for operation of the CPU. The required number of cores from among the subset of cores are then enabled.

In some implementations, the selection circuitry determines whether the performance parameter of the respective core is below a threshold level of performance. If so, the respective core is disabled. In some implementations, the plurality of cores comprises a number of cores that is greater than the required number of cores for operation of the CPU. Of the additional core, one may by enabled to take the place of a disabled core.

In some implementations, to determine, based on the test, a performance parameter of the respective core, the selection circuitry analyzes a result of the test corresponding to performance of the respective core with regard to functionality, speed, power utilization, leakage, and combinations thereof. The selection circuitry may evaluate one or more performance parameters for each core and determine an overall functionality of each core based on the one or more performance parameters.

In some implementations, each performance parameter has an associated weighting factor. The selection circuitry computes an overall performance of each respective core of the plurality of cores based on the plurality of performance factors of each respective core and the associated weighting factor of each performance parameter.

In some implementations, the selection circuitry periodically stores a current performance parameter as one of a plurality of stored past performance parameters. After storing the current performance parameter as one of a plurality of stored past performance parameters, the selection circuitry performs a test of each core of the plurality of cores to obtain a new current performance parameter of each respective core. The selection circuitry may then compare, for each respective core, the current performance parameter of the respective core to a past performance parameter of the respective core. If it is determined that performance of the respective core has decreased, the selection circuitry determining whether the performance of a first core that is disabled is greater than the performance of the respective core. If so, the selection circuitry enables the first core to take the place of the respective core, and then disables the respective core. The selection circuitry may also reassign to the newly enabled core operations with which the now disabled core was tasked. The duration of the period may be set programmatically such that the storage of performance parameters and retesting of cores can be performed automatically.

In some implementations, the testing of each core is performed during chip probing. In other implementations, the testing is performed during final testing or during system level testing.

Also described herein is a method for increasing yields of a manufacturing process for a CPU having multiple cores. A first number of cores required for operation of the CPU is determined. It is then predicted whether an expected number of defects in the CPU exceeds a threshold number. If so, a second number of cores for the CPU is determined to ensure that at least the first number of cores are functional. The CPU is then manufactured with a plurality of cores, the plurality of cores comprising the second number of cores. For each respective core of the plurality of cores, a test is performed to determine a performance parameter of the respective core. Each respective core is then classified for a set of functions based on the performance parameter of the respective core.

In some implementations, to predict whether an expected number of defects in the CPU exceeds a threshold number an area to be occupied by the first number of cores is calculated and an average defect density of the manufacturing process is determined. An expected number of defects is then calculated based on the area and the average defect density.

In some implementations, the second number of cores for the CPU is determined by first selecting a third number of additional cores. A combined area to be occupied by the first number of cores and the third number of cores is calculated and using the average defect density, an expected number of defects in the combined area is calculated. If it is determined that adding the third number of additional cores results in the predicted expected number of defects in the CPU being below the threshold number, then the second number is set to be equal to the sum of the first number and the third number.

In some implementations, in response to determining that adding the third number of additional cores does not result in the predicted expected number of defects in the CPU being below the threshold, a fourth number of additional cores that is larger than the third number of additional cores is selected and a new combined area is calculated. An expected number of defects in the new combined area is calculated based on the average defect density. If it is determined that adding the fourth number of additional cores results in the predicted expected number of defects in the CPU being below the threshold number, the second number is set to be equal to the sum of the first number and the fourth number.

BRIEF DESCRIPTION OF THE DRAWINGS

Further features of the subject matter of this disclosure, its nature and various advantages will become apparent upon consideration of the following detailed description, taken in conjunction with the accompanying drawings, in which like reference characters refer to like parts throughout, and in which.

DETAILED DESCRIPTION

Implementations described herein provide methods, systems and integrated circuit devices for attaining increased manufacturing yields by leveraging multi-core CPU architectures. Current manufacturing processes for electronic components, including multi-core CPUs, produce some defective components. When manufacturing small components, the yield of the manufacturing process can be quite high as many components can by physically manufactured on the same die while only a small percentage of them will be defective. However, when manufacturing larger components, such as multi-core CPUs, the yield tends to be far lower because the CPU occupies more area on the die, thus resulting in more defects being present in each CPU. While some defects can be tolerated and may not affect performance of the CPU, many other defects, or in some cases multiple defects, can affect performance, either by reducing the functionality of a particular core, or potentially by rendering an entire core of a multi-core CPU nonfunctional.

This disclosure describes methods and multi-core CPU devices that are adapted for attaining increased manufacturing yields. Multi-core CPUs containing more cores than required for operation in the system in which they are to be deployed can tolerate more defects while still remaining functional. In accordance with one aspect of the disclosure, a multi-core CPU includes, or is associated with, selection circuitry or other control circuitry which tests and tracks performance of each core of the CPU. The selection circuitry classifies each core based on its overall functionality and associates each core with a set of functions it is capable of performing. The selection circuitry may also disable those cores that are completely nonfunctional or otherwise not performing within certain minimum specifications.

In some implementations, the multi-core CPU is provided with one or more reserve cores that are initially inactive or disabled. Control circuitry associated with the CPU is configured to monitor performance of each core over the lifetime of the CPU. In response to detecting that performance of a given core drops below a threshold performance requirement, the control circuitry switches out the underperforming core for one of the reserve cores. For example, the underperforming core is deactivated, and a reserve core is activated in its place. Operations with which the underperforming core was previously tasked are also reassigned to the newly activate reserve core.

In the manufacturing process, additional cores beyond the number required for operation of the CPU in the system in which it will be deployed can be added to the design to ensure that at least the required number of cores are functional over an expected lifetime of a device in which the CPU is disposed. Analysis of the average defect density, i.e., the number of defects per unit of area, can be weighed against the cost of each additional core and the probability that the required number of cores will be functional for each possible number of cores are added in order to determine the optimal additional number of cores.

For example, the multiple cores occupy a large area on the chip and it is unlikely for all the cores to yield (i.e., be free of defects from the manufacturing process) at the same time in every chip. By way of example, if each core has an area of 3 mm² and the chip includes sixty cores, the total CPU area would be 180=². This large area reduces the likelihood that the entire CPU will contain no defects. Many die yield losses are the result of tiny defects in the complex manufacturing process. Defects are defined as any physical anomaly that causes a circuit to fail. This includes short circuits or resistive paths or open circuits caused by particles, excess metal that bridges across different metal lines causing short circuits, photoresist flakes, weak spots in insulators, pinholes, open circuits due to voids in the metal, scratches and so on. These defects are generally randomly distributed across the chip, and the density of defects on the chip may be measured as the number of circuit faults per unit area.

If a chip will not function unless it is completely free of defects, or at least free of defects in critical components such as CPU cores, then the probability that a die works is the probability that no defects lie within its area. Thus, the larger the die area, the higher the chance it includes one or more defects, and so the lower the probability that the resulting chip would be functional if the chip must be defect free to function.

Even if all the cores are defect-free, the parametric performance of the cores can vary greatly. In some cases, certain cores may be much slower or exhibit more power leakage than others, which will reduce the overall speed and/or power of the CPU. Furthermore, the manufacturing yield of a chip is the product of the full core yield and the yield of the rest of the components present on the chip. For example, even if every core of the CPU is fully functional and free of defects, a defect may be present in another area of the chip that renders the entire chip nonfunctional. The yield of a given chip can be calculated using a yield model such as the Bose-Einstein model, the Poisson model, the binomial model, or any other suitable yield model.

It is therefore advantageous to manufacture a multi-core CPU with more than the required number of cores. This allows for additional tolerance of defects in the CPU. Even if a defect causes a given core to be completely nonfunctional, the defective core can be swapped out and an additional core can be used in its place without a reduction in the overall processing power of the CPU. After the CPU is manufactured, the cores are tested, and their performance analyzed. Each core can then be classified based on its performance and assigned certain functions suitable for its performance. If a core is nonfunctional or very low functioning, it can be disabled. The cores can also be tested periodically during the lifetime of the CPU, allowing for performance of the CPU to be monitored and tracked over time. Suitable circuitry for monitoring performance over the lifetime of a circuit may be suitably adapted from CPU performance monitoring devices described in Hasko et al., U.S. Pat. No. 8,370,654 which is hereby incorporated herein in its entirety.

Figure 1:
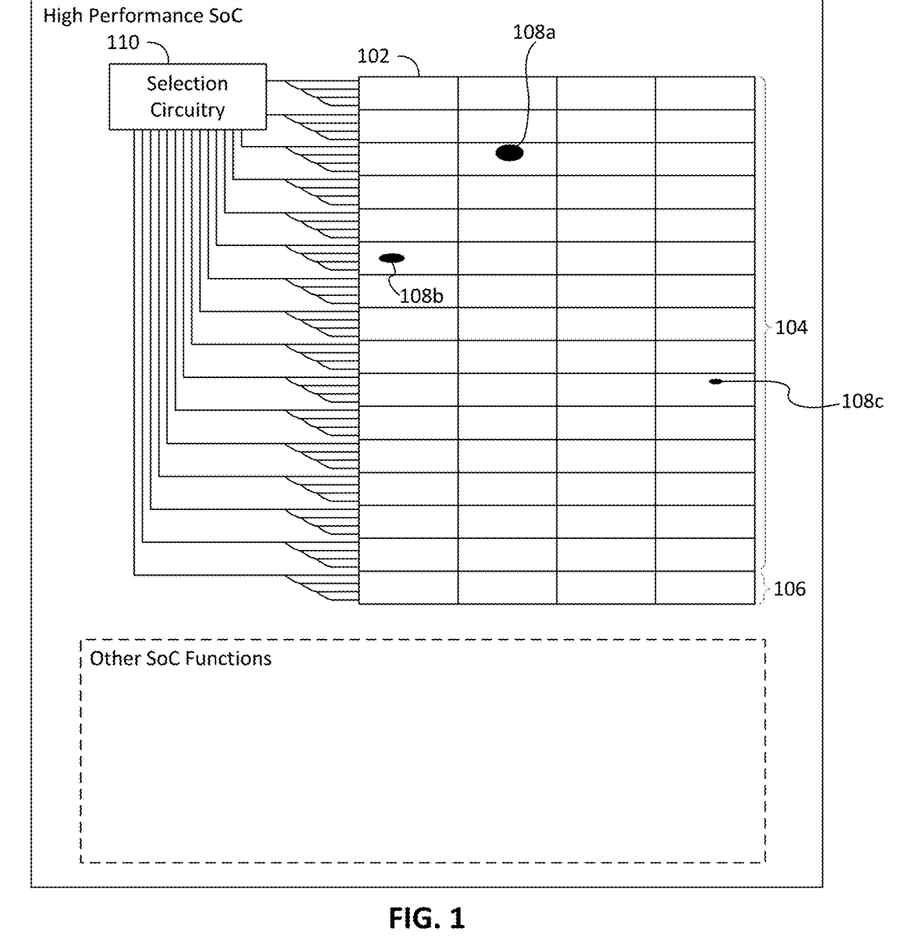
FIG. 1 is a block diagram illustrating components of a multi-core CPU implemented in an example of a system-on-chip in accordance with some implementations of the subject matter of this disclosure.

FIG. 1 is a block diagram illustrating components of a multi-core CPU implemented in an example of a system-on-chip in accordance with some implementations of the subject matter of this disclosure. A multi-core CPU can be deployed or implemented in any number of systems and may have any suitable number of cores. The methods and systems of this disclosure are discussed, as a non-limiting example, in the context of a high performance system-on-chip (SoC) 100 requiring a CPU 102 having sixty cores 104, which may be intended for use in infrastructure processors, server processors, artificial intelligence (AI) systems or machine learning systems. Based on the defect density of the manufacturing process and the area occupied by the sixty cores 104, an additional four cores 106 are added to CPU 100. Once CPU 100 is manufactured, defects 108a, 108b, and 108c may be present in portions of CPU 100. Depending on the size of each defect, the core in which the defect is located may have reduced functionality or may be completely nonfunctional. For example, defect 108a is large and may cause the core in which it is located to be nonfunctional. Defects 108b and 108c are smaller and may reduce the functionality of the cores in which they are located but not cause the respective cores in which they are located to be entirely nonfunctional.

Figure 2:
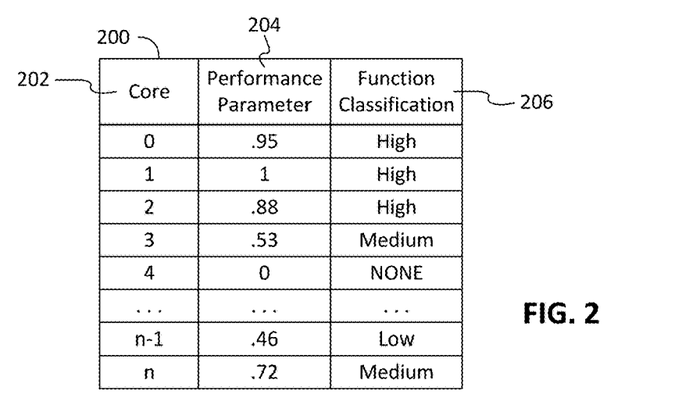
FIG. 2 is a table illustrating performance parameters and associated classifications of functionality for each core of a multi-core CPU in accordance with some implementations of the subject matter of this disclosure.

FIG. 2 is a table 200 illustrating performance parameters and associated classifications of functionality for each core of a multi-core CPU in accordance with some implementations of the subject matter of this disclosure. Table 200 is compiled by selection circuitry 110 from results of core testing performed by selection circuitry 110 at any point during manufacture, probing, and/or system level testing of the chip, and may also be performed periodically during use of the chip. Each row of table 200 includes three fields. Field 202 contains an identifier or index of a particular core of the CPU. Field 204 contains a performance parameter of the particular core. In some embodiments, multiple performance parameters may be tracked for each core and stored in table 200 either as multiple entries within field 204, or as separate fields within table 200. For simplicity, only one performance parameter is shown in FIG. 2. The performance parameter may be suitably a measure of speed, power utilization, leakage, or any other factor affecting overall functionality of a core. Alternatively or additionally, the performance parameter may represent a ratio of measured performance to design specifications for each core.

In the example of FIG. 2, for simplicity, the performance parameter is shown as a ratio of overall function of each core to the design specifications of each core. Field 206 indicates the functionality classification for each core, which is based on the performance parameter. High performing cores are classified as being highly functional, meaning they are suitable for the full range of functions and operation which the CPU will handle during its normal course of use. As the performance parameter values decrease, the classification of the corresponding core is lowered. A core with a performance parameter in a certain range, such as a ratio between 0.5 and 0.75, may be classified as having medium functionality, meaning that it is suitable for many functions, but not those of high complexity or requiring higher powered operations. A core with a performance parameter ratio between 0.25 and 0.5 may be classified as low functioning and be used only for simple operations. A core with a performance parameter that falls below a threshold level (e.g., 0.25) is not suitable for any functions and is classified as nonfunctional, in this implementation.

Figure 3:
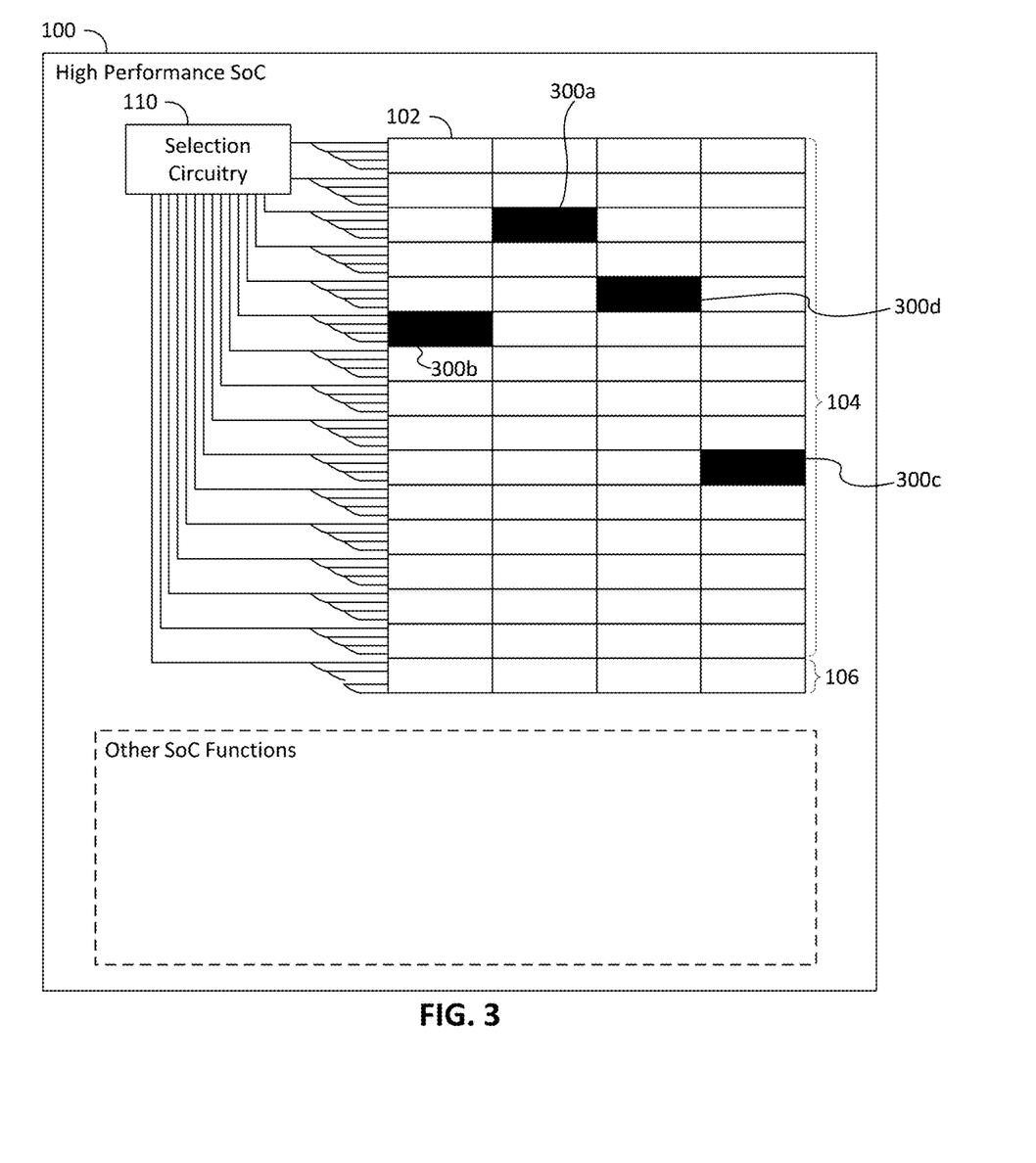
FIG. 3 is a block diagram illustrating the disabling of some cores of a multi-core CPU in accordance with some implementations of the subject matter of this disclosure.

After each core has been classified, nonfunctional cores can be disabled. FIG. 3 is a block diagram illustrating the disabling of some cores of multi-core CPU 102 in accordance with some implementations of the subject matter of this disclosure. In the example of FIG. 3, cores 300a, 300b, 300c, and 300d are disabled by selection circuitry 110. Because CPU 102 was designed with four additional cores 106, overall functionality of the CPU, which requires sixty cores in this example, is maintained even though four cores have been disabled due to low functionality or non-functionality.

In some implementations, selection circuitry 110 periodically or continuously monitors performance of each core of CPU 102. For example, the speed of each core can be monitored using circuitry, such as a ring oscillator, adapted from circuitry described in above-incorporated U.S. Pat. No. 8,370,654. If, at any time during the lifetime of CPU 102, selection circuitry 110 detects a decrease in performance of a given core, or if the performance of a given core falls below a threshold level of performance, selection circuitry 110 disables the given core and enables an inactive or previously disabled core to take its place. Periodic monitoring can be set programmatically, allowing for these functions to be performed automatically.

Figure 4:
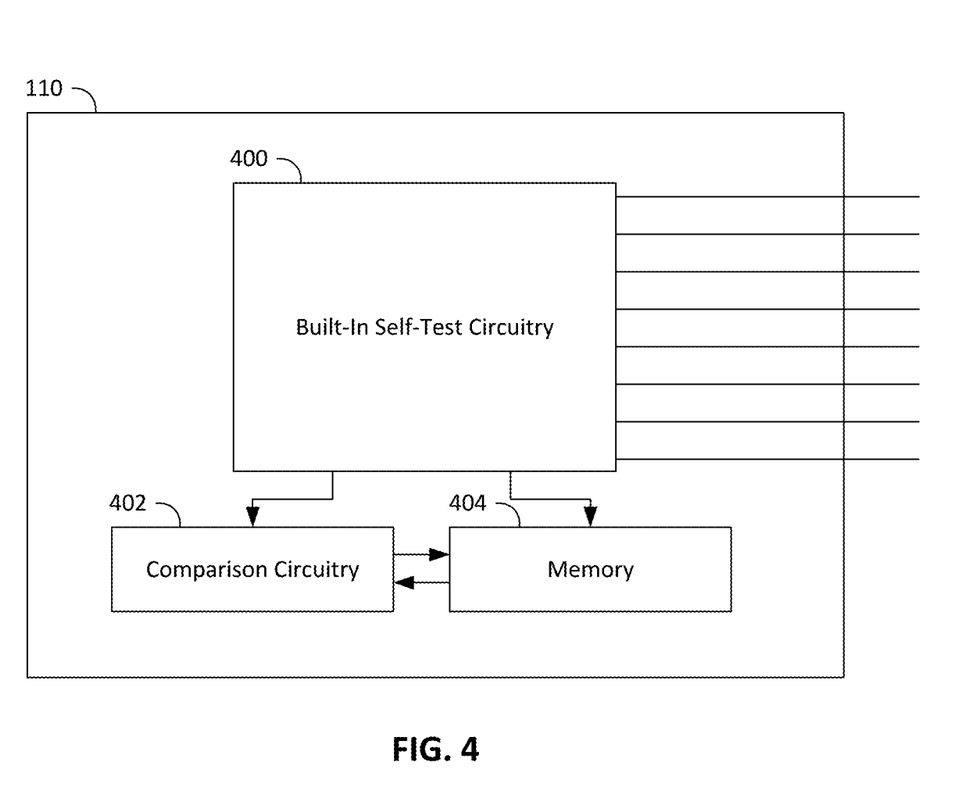
FIG. 4 is a block diagram illustrating components of a selection block associated with a multi-core CPU in accordance with some implementations of the subject matter of this disclosure.

FIG. 4 is a block diagram illustrating components of a selection block associated with a multi-core CPU, such as selection circuitry 110, in accordance with some implementations of the subject matter of this disclosure. Selection circuitry 110 includes built-in self-test (BIST) circuitry 400. BIST circuitry 400 communicates with each individual core of CPU 102 and can detect various performance parameters of each core, including power utilization, speed, and leakage. It is note that, while not depicted, it is possible to include additional components such as multiplexers or other components with addressable ports in order to allow for communications between selection circuitry 110 and the large number of cores in CPU 102, thereby reducing the number of physical connections to selection circuitry 110 that need to be made. BIST circuitry 400 communicates the various performance parameters to comparison circuitry 402 which compares the performance parameters to set threshold levels. The threshold levels may be based on the design specifications of the CPU. The design specifications may be stored in memory 404 and retrieved by comparison circuitry 402 when needed. For example, if a core is designed to operate at a speed of 1 GHz, the threshold levels may be set to 800 MHz, 500 MHz, and 200 MHz. Each performance parameter falls within a range defined by the threshold levels, and comparison circuitry 402 may classify each core accordingly.

BIST circuitry 400 may also store performance parameters in memory 404 as past performance parameters for later comparison against current performance parameters. This helps determine the overall health of CPU 102 and allows selection circuitry 110 to dynamically disable cores having newly reduced functionality and re-enable previously disable cores that may function better than a currently low-functioning core.

Figure 5:
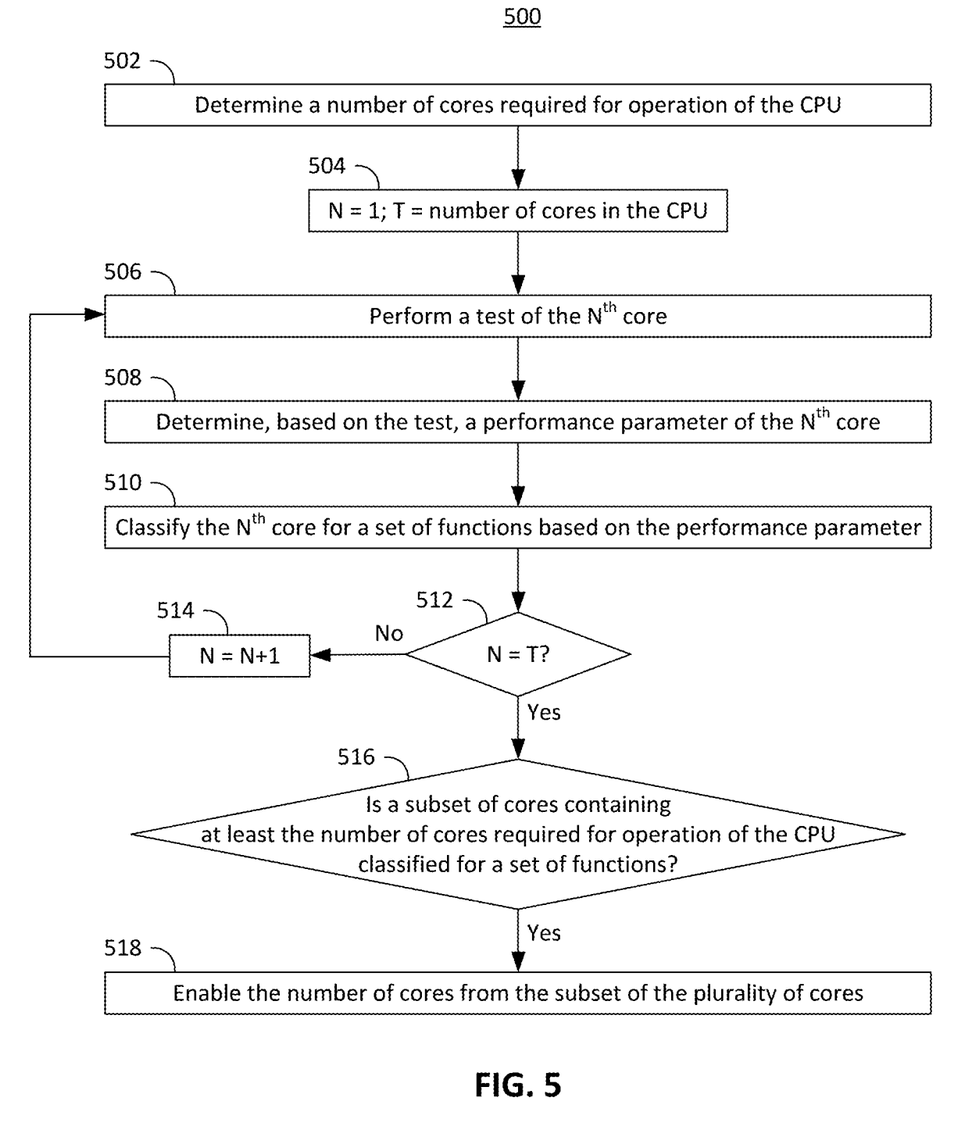
FIG. 5 is a flow diagram representing a process for determining the functionality of each core of a multi-core CPU and enabling those cores which are functional in accordance with some implementations of the subject matter of this disclosure.

FIG. 5 is a flow diagram representing a process 500 for determining the functionality of each core of a multi-core CPU and enabling those cores which are functional in accordance with some implementations of the subject matter of this disclosure. At 502, selection circuitry 110 or other control circuitry of SoC 100 determines a number of cores required for operation of CPU 102. For example, memory 404 of selection circuitry 110 may store design specification for SoC 100 or another system in which CPU 102 is to be deployed. At 504, selection circuitry 110 initializes a counter variable N, settings its value to 1, and a variable T representing the number of cores contained in CPU 102, including cores 104 and additional cores 106.

At 506, selection circuitry 110 performs a test of the $N^{th}$ core of CPU 102 and, at 508, determines a performance parameter of the $N^{th}$ core based on the test. For example, selection circuitry 110 may test power utilization of the $N^{th}$ core and determine that it is consuming five volts. As another example, selection circuitry 110 may test the speed of the $N^{th}$ core and compare the detected speed of the $N^{th}$ core with a specified clock speed of the $N^{th}$ core or of CPU 102 as a whole. Selection circuitry 110 may determine whether the speed of the $N^{th}$ core is within a tolerance threshold of the specified clock speed. In some implementations, selection circuitry 110 may monitor or test for multiple parameters. For example, selection circuitry 110 may test the $N^{th}$ core for both speed and power utilization. Selection circuitry 110 may determine the performance parameter as a raw value identified by the test or may compare the raw value with design specifications of CPU 102 to calculate a performance ratio. Selection circuitry 110 may use more than one performance parameter to calculate a performance ratio of the $N^{th}$ core. Each performance parameter may be assigned a weighting factor. For example, speed may be considered the most important performance parameters and may therefore be assigned a high weighting factor, such as a factor of 0.9 or 1. Less important parameters may be assigned correspondingly lower weighting factors. For example, in a system in which power consumption is not of particular importance, a power utilization parameter may be assigned a low weighting factor, such as 0.2. At 510, selection circuitry 110 classifies the $N^{th}$ core for a set of functions based on the performance parameter.

At 512, selection circuitry 110 determines whether N is equal to T, meaning that all cores of CPU 102 have been tested. If not ("No" at 512), then, at 514, selection circuitry 110 increments the value of N by 1, and processing returns to step 506. If N is equal to T ("Yes" at 512), then, at 516, selection circuitry 110 determines whether a subset of cores containing at least the number of cores required for operation of CPU 102 is classified for a set of functions. For example, CPU 102 may include sixty cores 104 and four additional cores 106 for a total of sixty-four cores. Operation of CPU 102 requires sixty functional cores. After classifying all sixty-four cores, selection circuitry 110 may determine that three cores are not functional, but that the remaining sixty-one cores are functional to at least some degree. Therefore, there is a subset of cores (i.e., sixty-one out of sixty-four cores) that contains at least the number of cores required for operation of CPU 102 (i.e., sixty cores). If there is a subset of cores containing at least the number of cores required for operation of CPU 102 ("Yes" at 516), then, at 518, selection circuitry 110 enables the number of cores from the subset of the plurality of cores. Continuing the above example, selection circuitry 110 enables sixty out of the sixty-one cores that are functional. Selection circuitry 110 may select the sixty cores at random or may select the sixty highest functioning cores out of the sixty-one functional cores. Selection circuitry 110 may also provide a coupling of the sixty selected cores to a distributor (not shown) for distributing various computational tasks to active CPU cores.

Figure 6:
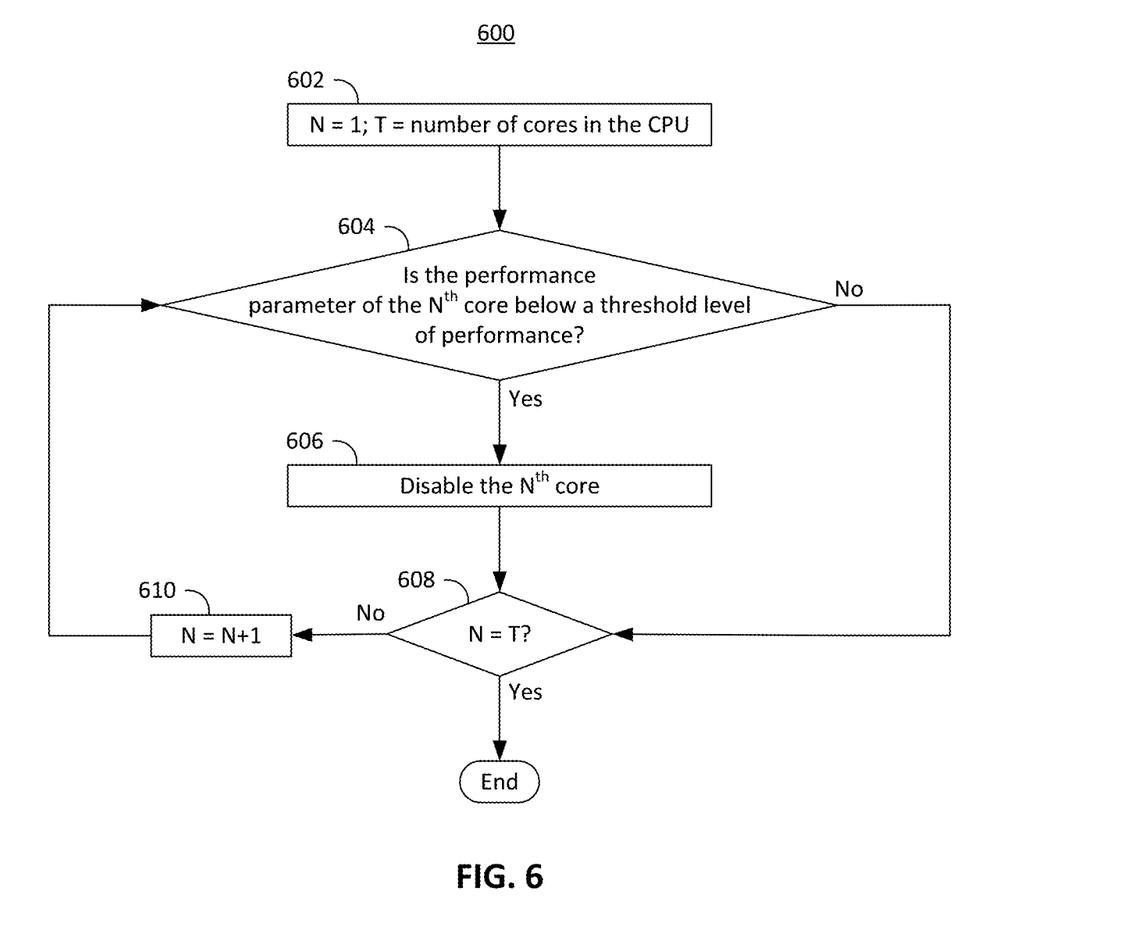
FIG. 6 is a flow diagram representing a process for disabling nonfunctional cores of a multi-core CPU in accordance with some implementations of the subject matter of this disclosure.

FIG. 6 is a flow diagram representing a process for disabling nonfunctional cores of a multi-core CPU in accordance with some implementations of the subject matter of this disclosure. At 602, selection circuitry 110 initializes a counter variable N, setting its value to 1, and a variable T, representing the number of cores in CPU 102. At 604, selection circuitry 110 determines whether the performance parameter of the $N^{th}$ core is below a threshold performance level. For example, as discussed above, selection circuitry 110 may set a threshold level based on a percentage of maximum performance as specified in the design of CPU 102. Selection circuitry 110 compares the performance parameter of the $N^{th}$ core with a threshold level corresponding to a minimum functionality level. If the performance parameter of the $N^{th}$ core falls below this threshold level ("Yes" at 604), then, at 606, selection circuitry 110 disables the $N^{th}$ core.

After disabling the $N^{th}$ core, or if the performance parameter of the $N^{th}$ core meets or exceeds the threshold level of performance ("No" at 604), at 608, selection circuitry 110 determines whether N is equal to T, meaning that the performance level of each core has been compared with the threshold level. If N is not equal to T ("No" at 608), then, at 910, selection circuitry 110 increments the value of N by 1, and processing returns to step 604. If N is equal to T ("Yes" at 608) then the process is complete.

Figure 7:
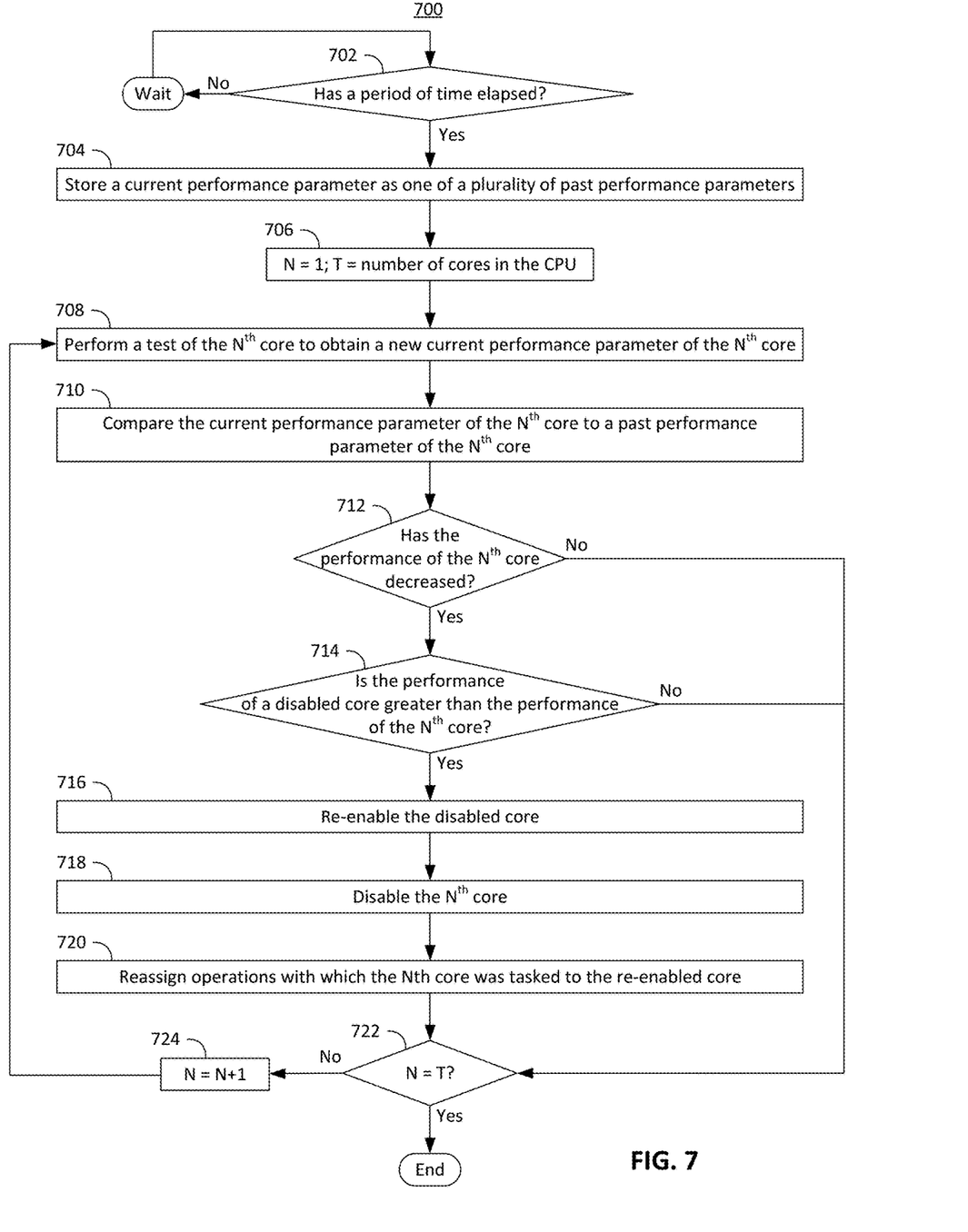
FIG. 7 is a flow diagram representing a process for updating performance parameters of each core of a multi-core CPU, disabling cores that have reduced functionality and re-enabling previously disabled cores in their place in accordance with some implementations of the subject matter of this disclosure.

FIG. 7 is a flow diagram representing a process for updating performance parameters of each core of a multi-core CPU, disabling cores that have reduced functionality and re-enabling previously disabled cores in their place in accordance with some implementations of the subject matter of this disclosure. Selection circuitry 110 may include a timing circuit or other counter to track an elapsed period of time from a last core test. Selection circuitry 110 may, for example, retest each core every twenty-four hours to ensure maximum performance of CPU 102. At 702, selection circuitry 110 determines whether the set period of time (e.g., twenty-four hours) has elapsed. If the period of time has not elapsed ("No" at 702), selection circuitry 110 continues to wait. However, if the period time has elapsed ("Yes" at 702), then, at 704, selection circuitry 110 stores a current performance parameter as one of a plurality of past performance parameters. For example, selection circuitry 110 may store the current performance parameter in memory 404. At 706, selection circuitry 110 initializes a counter variable N, setting its value to 1, and a variable T, representing the number of cores in CPU 102. At 708, selection circuitry 110 performs a test of the $N^{th}$ core to obtain a new current performance parameter on the $N^{th}$ core. This may be accomplished using methods described above in connection with FIG. 5.

At 710, selection circuitry 110 compares the current performance parameter of the $N^{th}$ core to a past performance parameter of the $N^{th}$ core. At 712, selection circuitry determines, based on the comparison, whether performance of the $N^{th}$ core has decreased. If so ("Yes" at 712), then, at 714, selection circuitry 110 determines whether the past performance of a currently disabled core is greater than the performance of the $N^{th}$ core. If so ("Yes" at 714), then selection circuitry 110 re-enables the disabled core (at 716), disables the $N^{th}$ core (at 718), and reassigns operations with which the $N^{th}$ core was tasked to the re-enabled core (at 720).

After reassigning the operations of the $N^{th}$ core to the re-enabled core, or if either the performance of the $N^{th}$ core has not decreased or the performance of a disabled core is not greater than that of the $N^{th}$ core, at 722, selection circuitry 110 determines whether N is equal to T, meaning that all cores have been tested. If N is not equal to T ("No" at 722), then, at 724, selection circuitry 110 increments the value of N by 1, and processing returns to step 708. If N is equal to T ("Yes" at 722), then the process is complete. Selection circuitry 110 may reset the timer or other counter used to determine whether the time period has yet elapsed.

Figure 8:
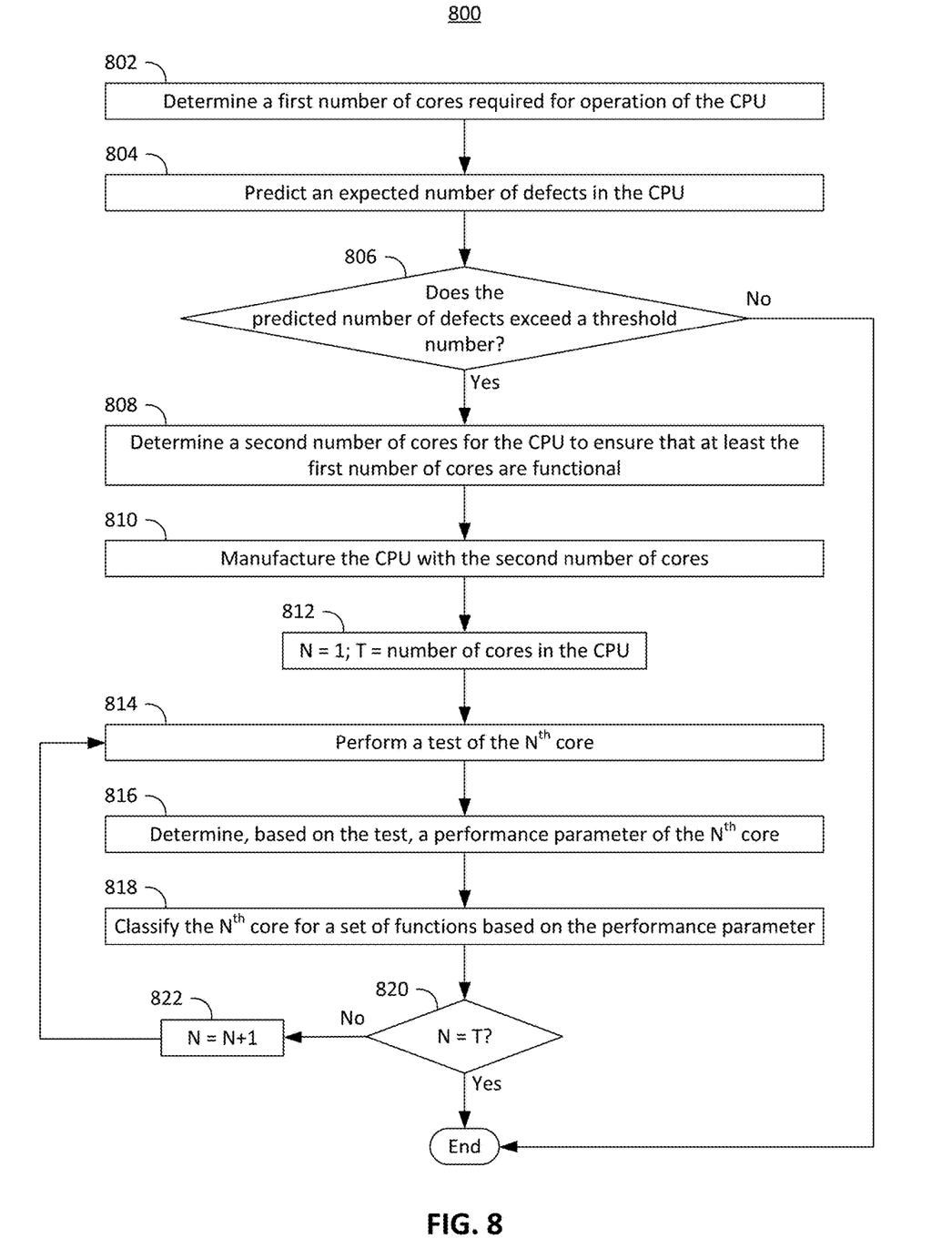
FIG. 8 is a flow diagram representing a processing for manufacturing a multi-core CPU in accordance with some implementations of the subject matter of this disclosure.

FIG. 8 is a flow diagram representing a processing for manufacturing a multi-core CPU in accordance with some implementations of the subject matter of this disclosure. At 802, control circuitry used for designing CPU 102 determines a first number of cores required for operation of CPU 102. For example, the control circuitry may determine that, based on the demands of the system in which CPU 102 will be deployed, that CPU 102 requires sixty cores. Alternatively or additionally, a design parameter of CPU 102, which may be retrievable by the control circuitry, may indicate the required number of cores. At 804, the control circuitry predicts an expected number of defects in the CPU. This may be accomplished using methods described below in connection with FIG. 9. At 806, the control circuitry determines whether the predicted number of defects exceeds a threshold number of permissible defects. If so ("Yes" at 806), then, at 808, the control circuitry determines a second number of cores for the CPU to ensure that at least the first number of cores is functional. This may be accomplished, for example, using methods described below in connection with FIG. 10.

At 810, CPU 102 is manufactured with the second number of cores. At 812, external testing circuitry or selection circuitry 110 initializes a counter variable N, setting its value to 1, and a variable T, representing the number of cores in CPU 102. At 814, the external testing circuitry or selection circuitry 110 performs a test of the $N^{th}$ core. At 816, the external testing circuitry or selection circuitry 110 determines, based on the test, a performance parameter of the $N^{th}$ core and, at 816, classifies the $N^{th}$ core for a set of functions based on the performance parameter. This may be accomplished using methods described above in connection with FIG. 5.

At 820, the external testing circuitry or selection circuitry 110 determines whether N is equal to T, meaning that all cores have been tested. If N is not equal to T ("No" at 820), then, at 822, the external testing circuitry or selection circuitry 110 increments the value of N by 1, and processing returns to step 814. If N is equal to T ("Yes" at 820), or if the predicted number of defects does not exceed a threshold ("No" at 806), then the process is complete.

Figure 9:
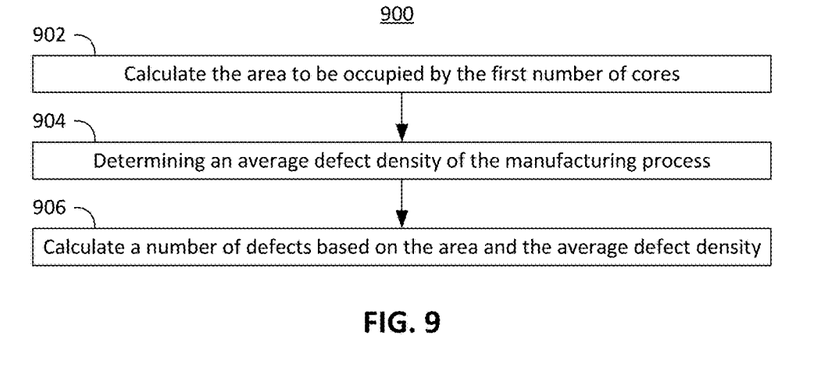
FIG. 9 is a flow diagram representing a process for predicting the number of defects in a multi-core CPU in accordance with some implementations of the subject matter of this disclosure.

FIG. 9 is a flow diagram representing a process for predicting then number of defects in a multi-core CPU in accordance with some implementations of the disclosure. At 902, the control circuitry for the design process calculates an area to be occupied by the first number of cores. For example, each core occupies an area of 3 mm$^2$, so sixty cores will occupy 180 mm$^2$ on the chip. At 904, the control circuitry determines an average defect density of the manufacturing process. The average defect density is the average number of defects per unit of area. This may be tracked and updated after each time a chip is manufactured and stored in a memory location accessible to the control circuitry. For example, after each manufacturing run, one or more chips produced in that run may be scanned for defects. This may include optical scanning, chip probing, or any other suitable type of scan for identifying defects in a chip. The number of defects detected in the scan is divided by the total area of the chip being scanned, providing a measure of defects per unit of area. This number may be averaged together with measurements of defects per unit of area from previous manufacturing runs for the same or different chips.

At 906, the control circuitry calculates a number of defects predicted to be present in CPU 102 based on the area of CPU 102 and the average defect density for the manufacturing process. For example, the average defect density may be 10 defects per square centimeter, or 0.1 defects per square millimeter. The control circuitry would thus calculate that eighteen defects will occur within the area occupied by the cores 104 of CPU 102. In some implementations it may not be possible to predict a specific location within CPU 102 at which each of the predicted defects will occur, or what impact each defect will have on the functionality of CPU 102. In some implementations, control circuitry may track not only the number of defects per unit of area over time, but also the location of each defect. If defects are found to be clustered in specific locations, it can be predicted that defects will occur in that location again. In some implementations, the control circuitry may also track the size of each defect. Larger defects, when located in CPU cores 104 and 106, are more likely to result in one or more nonfunctional cores, while cores with smaller defects may be functional, albeit in a reduced capacity.

Figure 10:
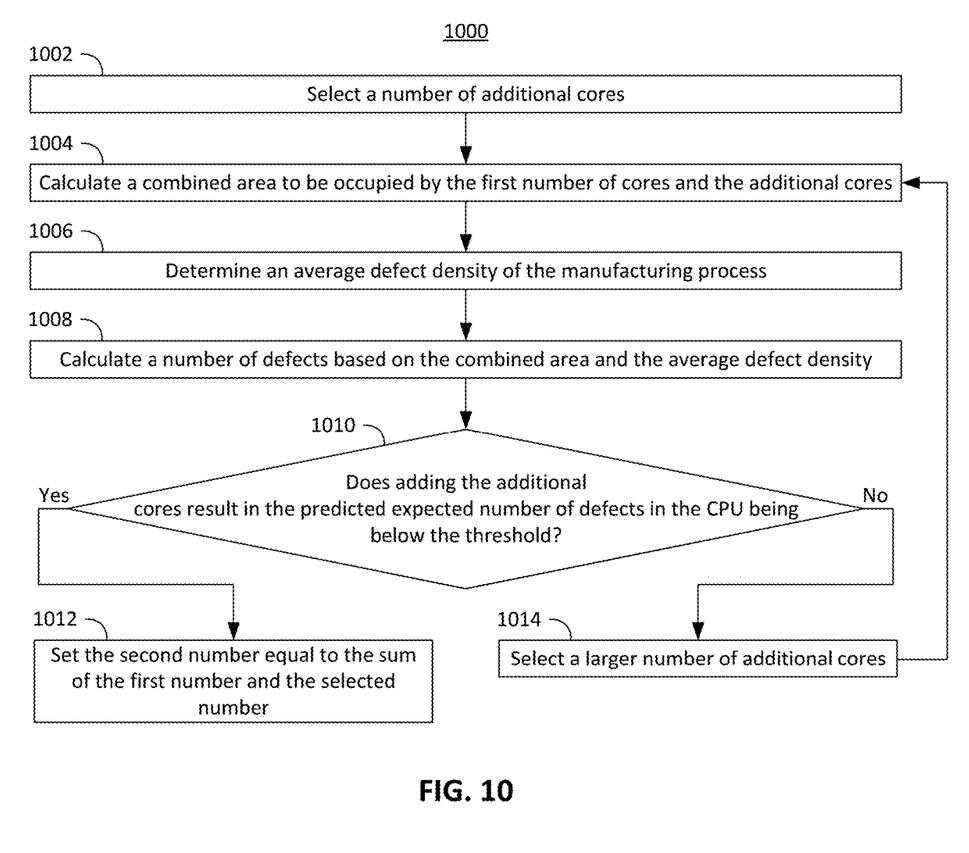
FIG. 10 is a flow diagram representing a process for selecting an additional number of cores to add to the design of a multi-core CPU in accordance with some implementations of the subject matter of this disclosure.

FIG. 10 is a flow diagram representing a process for selecting an additional number of cores to add to the design of a multi-core CPU in accordance with some implementations of the disclosure. At 1002, the control circuitry selects an additional number of cores. The selection of the number of additional cores may be based on an analysis of the cost of each additional core against the number of defects predicted in order to find the best balance. At 1004, the control circuitry calculates a combined area to be occupied by the first number of cores and the additional cores. At 1006, the control circuitry determines the average defect density of the manufacturing process and, at 1008, predicts the expected number of defects based on the combined area and the average defect density. This may be accomplished using methods described above in connection with FIG. 9. In some implementations, the location of defects may also be tracked through each manufacturing process. If defects are known to occur consistently in certain locations, the number of defects which may result in nonfunctional cores may further be predicted.

At 1010, the control circuitry determines whether adding the additional cores results in the predicted expected number of defects in the CPU being below the threshold. If so ("Yes" at 1010), then, at 1012, the control circuitry sets the second number of cores equal to the sum of the first number and the selected number. If not ("No" at 1010), then, at 1014, the control circuitry selects a larger number of additional cores, and processing returns to step 1004.

Various implementations discussed in conjunction with FIGS. 1-10 are performed by various electronic components of one or more electronic circuits, such as but not limited to an integrated circuit, application-specific integrated circuit (ASIC), and/or the like. Various components discussed throughout this disclosure such as, but not limited to selection circuitry 110, and/or the like, are configured to include a set of electronic circuit components, and communicatively operate on one or more electronic circuits. Various implementations and components disclosed herein are configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the subject matter of this disclosure. It is intended that the following claims define the scope of the subject matter of this disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations must be performed to achieve the desirable results.

The subject matter of this disclosure has been described in terms of particular aspects, but other aspects can be implemented and are within the scope of the following claims. For example, the actions recited in the claims can be performed in a different order and still achieve desirable results. As one example, the processes depicted in FIGS. 5-10 do not necessarily require the particular order shown, or sequential order, to achieve desirable results. In certain implementations, multitasking and parallel processing may be advantageous. Other variations are within the scope of the following claims.

What is claimed is:

1. A method for configuring a central processing unit (CPU) having a plurality of cores, the method comprising:
    determining a number of cores among the plurality of cores required for operation of the CPU;
    for each respective core among the plurality of cores:
        performing a test of the respective core;
        determining, based on the test, a performance parameter of the respective core; and
        classifying the respective core for suitability to perform a set of functions based on the performance parameter of the respective core;
    determining whether at least the number of cores required for operation of the CPU, among the plurality of cores, are classified for suitability to perform the set of functions; and
    defining a subset of suitable cores among the plurality of cores, the subset of suitable cores including i) cores that are classified for the set of functions and ii) at least the number of cores required for operation of the CPU; and
    enabling the number of cores from among the subset of suitable cores, including automatically assigning to each respective core the set of functions for which the respective core is classified as suitable.

2. The method of claim 1, further comprising:
    determining whether the performance parameter of the respective core is below a threshold level of performance; and
    in response to determining that the performance parameter of the respective core is below a threshold level of performance, disabling the respective core.

3. The method of claim 1, wherein the plurality of cores comprises a number of cores that is greater than the required number of cores.

4. The method of claim 1, wherein determining, based on the test, a performance parameter of the respective core comprises analyzing a result of the test corresponding to performance of the respective core with regard to functionality, speed, power utilization, leakage, and combinations thereof.

5. The method of claim 1, further comprising:
    evaluating a plurality of performance parameters for each respective core; and
    determining an overall functionality of each respective core based on the plurality of performance parameters.

6. The method of claim 5, wherein each performance parameter of the plurality of performance parameters has an associated weighting factor, the method further comprising computing an overall performance of each respective core of the plurality of cores based on the plurality of performance factors of each respective core and the associated weighting factor of each performance parameter.

7. The method of claim 1, further comprising:
    periodically storing a current performance parameter as one of a plurality of stored past performance parameters; and
    after storing the current performance parameter as one of a plurality of stored past performance parameters, performing a test of each core of the plurality of cores to obtain a new current performance parameter of each respective core.

8. The method of claim 7, further comprising:
comparing, for each respective core, the current performance parameter of the respective core to a past performance parameter of the respective core;
determining, based on the comparing, whether performance of the respective core has decreased;
in response to determining that performance of the respective core has decreased, determining whether the performance of a first core that is disabled is greater than the performance of the respective core; and
in response to determining that the performance of a first core that is disabled is greater than the performance of the respective core:
   newly enabling the first core; and
   disabling the respective core.

9. The method of claim 8, further comprising reassigning to the newly enabled first core operations with which the respective core was tasked.

10. The method of claim 1, further comprising performing a test of each respective core during one of chip probing, final testing, and system level testing.

11. The method of claim 1, wherein:
the plurality of cores includes a first subset of cores including the required number of cores and a second subset of cores including a first number of reserve cores;
the reserve cores are initially disabled; and
the method further comprises:
   monitoring performance of each core of the first subset of cores; and
   in response to detecting, during the monitoring, that performance of a first core of the first subset of cores is below a threshold level of performance:
      disabling the first core of the first subset of cores;
      enabling a reserve core of the second subset of cores; and
      reassigning operations with which the first core of the first subsets was tasked to the second core of the second subset of cores.

12. A central processing unit (CPU), comprising:
a plurality of cores including a first number of cores that is greater than a number of cores required for operation of the CPU; and
control circuitry configured to:
   for each respective core among the plurality of cores:
      perform a test of the respective core;
      determine, based on the test, a performance parameter of the respective core; and
      classify the respective core for suitability to perform a set of functions based on the performance parameter of the respective core;
   determine whether at least the number of cores required for operation of the CPU, among the plurality of cores, are classified as suitable to perform the set of functions; and
   define a subset of suitable cores among the plurality of cores, the subset of suitable cores including (i) cores that are classified as suitable for the set of functions and (ii) at least the number of cores required for operation of the CPU; and
   enable the number of cores from among the subset of suitable cores, including automatically assigning to each respective core the set of functions for which the respective core is classified as suitable.

13. The CPU of claim 12, wherein the control circuitry is further configured to:
   determine whether the performance parameter of the respective core is below a threshold level of performance; and
   in response to determining that the performance parameter of the respective core is below a threshold level of performance, disable the respective core.

14. The CPU of claim 12, wherein the plurality of cores comprises a number of cores that is greater than the required number of cores.

15. The CPU of claim 12, wherein the control circuitry configured to determine, based on the test, a performance parameter of the respective core is further configured to analyze a result of the test corresponding to performance of the respective core with regard to functionality, speed, power utilization, and leakage, and combinations thereof.

16. The CPU of claim 12, wherein the control circuitry is further configured to:
   evaluate a plurality of performance parameters for each respective core; and
   determine an overall functionality of each respective core based on the plurality of performance parameters.

17. The CPU of claim 16, wherein:
each performance parameter of the plurality of performance parameters has an associated weighting factor;
the control circuitry being further configured to compute an overall performance of each respective core of the plurality of cores based on the plurality of performance factors of each respective core and the associated weighting factor of each performance parameter.

18. The CPU of claim 12, wherein the control circuitry is further configured to:
   periodically store a current performance parameter as one of a plurality of stored past performance parameters; and
   after storing the current performance parameters as one of a plurality of stored past performance parameters, performing a test of each core of the plurality of cores to obtain a new current performance parameter of each respective core.

19. The CPU of claim 18, wherein the control circuitry is further configured to:
   compare, for each respective core, the current performance parameter of the respective core to a past performance parameter of the respective core;
   determine, based on the comparing, whether performance of the respective core has decreased;
   in response to determining that performance of the respective core has decreased, determine whether the performance of a first core that is disabled is greater than the performance of the respective core; and
   in response to determining that the performance of a first core that is disabled is greater than the performance of the respective core:
      newly enable the first core; and
      disable the respective core.

20. The CPU of claim 19, wherein the control circuitry is further configured to reassign to the newly enabled first core operations with which the respective core was tasked.

21. The CPU of claim 12, wherein the control circuitry is further configured to perform a test of each respective core during one of chip probing, final testing, and system level testing.

22. The CPU of claim 12, wherein:
- the plurality of cores includes a first subset of cores including the required number of cores and a second subset of cores including a first number of reserve cores;
- the reserve cores are initially disabled; and
- the control circuitry is further configured to:
  - monitor performance of each core of the first subset of cores; and
  - in response to detecting, during the monitoring, that performance of a first core of the first subset of cores is below a threshold level of performance:
    - disable the first core of the first subset of cores;
    - enable a reserve core of the second subset of cores; and
    - reassign, to the reserve core of the second subset of cores, operations with which the first core of the first subset was tasked.

* * * * *